US008589226B1

(12) United States Patent
Thompson (10) Patent No.: US 8,589,226 B1
(45) Date of Patent: *Nov. 19, 2013

(54) METHODS AND SYSTEMS FOR PROVIDING A MERCHANT FUNDED INCENTIVE REBATE OR AWARDS PROGRAM

(75) Inventor: Michael P. Thompson, Nashville, TN (US)

(73) Assignee: Tuitionfund, LLC., Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/437,394

(22) Filed: Apr. 2, 2012

Related U.S. Application Data

(60) Continuation of application No. 13/300,167, filed on Nov. 18, 2011, now Pat. No. 8,156,000, which is a division of application No. 13/033,208, filed on Feb. 23, 2011, now Pat. No. 8,065,183, which is a division of application No. 12/649,903, filed on Dec. 30, 2009, now Pat. No. 7,899,704, which is a continuation of application No. 12/347,136, filed on Dec. 31, 2008, now Pat. No. 7,653,572, which is a continuation of application No. 09/703,562, filed on Nov. 1, 2000, now Pat. No. 7,499,872.

(60) Provisional application No. 60/208,727, filed on Jun. 2, 2000.

(51) Int. Cl.
*G06Q 30/00* (2012.01)

(52) U.S. Cl.
USPC .................................................. 705/14.34

(58) Field of Classification Search
USPC .................................................. 705/14.34
See application file for complete search history.

(56) References Cited

U.S. PATENT DOCUMENTS

| 4,727,243 A | 2/1988 | Sarver |
| 4,750,119 A | 6/1988 | Cohen et al. |
| 4,941,090 A | 7/1990 | McCarthy |

(Continued)

FOREIGN PATENT DOCUMENTS

| AU | 48289/96 | 3/1997 |
| AU | 676819 B | 3/1997 |

(Continued)

OTHER PUBLICATIONS

"Goldome Charged with Trying to Monopolize Cash Discount System," The American Banker, Jul. 26, 1983, LexisNexis Academic, Copyright 1983 American Banker, Inc., 5 pages total.

(Continued)

*Primary Examiner* — James W Myhre
(74) *Attorney, Agent, or Firm* — Birch, Stewart, Kolasch & Birch, LLP.

(57) ABSTRACT

The invention involves facilitating retail transactions between participating enrolled members and participating merchants funding awards to said members. Incentive offers may be advertised to members, including targeted offers to specific members. Account purchase transaction information of participating merchants is a) tracked by processor(s) belonging to a tracking entity, b) monitored by processor(s) and correlated with stored enrolled member information, and c) processor(s) determine whether a purchase transaction is between an enrolled member and participating merchant and if such transaction entitles the member to a merchant funded award; with such processor(s) being located other than at the participating merchant's location. The remote monitoring and determining gives the program transparency; no special purpose cards/accounts need to be presented by the member and no additional checkout procedures need to be performed by participating merchants. The awards can be applied as a credit or offset to various accounts, financial instruments or obligations.

28 Claims, 6 Drawing Sheets

(56) References Cited

U.S. PATENT DOCUMENTS

| | | | |
|---|---|---|---|
| 5,025,372 | A | 6/1991 | Burton et al. |
| 5,056,019 | A | 10/1991 | Schultz et al. |
| 5,117,355 | A | 5/1992 | McCarthy |
| 5,202,826 | A | 4/1993 | McCarthy |
| 5,287,268 | A | 2/1994 | McCarthy |
| 5,297,026 | A | 3/1994 | Hoffman |
| 5,467,269 | A | 11/1995 | Flaten |
| 5,471,669 | A | 11/1995 | Lidman |
| 5,513,102 | A | 4/1996 | Auriemma |
| 5,537,314 | A | 7/1996 | Kanter |
| 5,644,727 | A | 7/1997 | Atkins |
| 5,664,112 | A | 9/1997 | Sturgeon et al. |
| 5,689,100 | A | 11/1997 | Carrithers et al. |
| 5,708,780 | A | 1/1998 | Levergood et al. |
| 5,715,314 | A | 2/1998 | Payne et al. |
| 5,727,163 | A | 3/1998 | Bezos |
| 5,729,693 | A | 3/1998 | Holda-Fleck |
| 5,734,838 | A | 3/1998 | Robinson et al. |
| 5,745,706 | A | 4/1998 | Wolfberg et al. |
| 5,761,648 | A | 6/1998 | Golden et al. |
| 5,774,870 | A | 6/1998 | Storey |
| 5,787,404 | A | 7/1998 | Fernandez-Holmann |
| 5,875,437 | A | 2/1999 | Atkins |
| 5,970,469 | A | 10/1999 | Scroggie et al. |
| 5,970,480 | A | 10/1999 | Kalina |
| 5,991,736 | A | 11/1999 | Ferguson et al. |
| 5,999,914 | A | 12/1999 | Blinn et al. |
| 6,000,608 | A | 12/1999 | Dorf |
| 6,009,411 | A | 12/1999 | Kepecs |
| 6,009,412 | A | 12/1999 | Storey |
| 6,014,635 | A | 1/2000 | Harris et al. |
| 6,014,643 | A | 1/2000 | Minton |
| 6,029,141 | A | 2/2000 | Bezos et al. |
| 6,041,308 | A | 3/2000 | Walker et al. |
| 6,061,660 | A | 5/2000 | Eggleston et al. |
| 6,070,153 | A | 5/2000 | Simpson |
| 6,105,865 | A | 8/2000 | Hardesty |
| 6,164,533 | A | 12/2000 | Barton |
| 6,195,444 | B1 | 2/2001 | Simanovsky et al. |
| 6,195,644 | B1 | 2/2001 | Bowie |
| 6,222,914 | B1 | 4/2001 | McMullin |
| 6,243,688 | B1 | 6/2001 | Kalina |
| 6,327,573 | B1 | 12/2001 | Walker et al. |
| 6,332,126 | B1 | 12/2001 | Peirce et al. |
| 6,345,261 | B1 | 2/2002 | Feidelson et al. |
| 6,386,444 | B1 | 5/2002 | Sullivan |
| 6,415,261 | B1 | 7/2002 | Cybul et al. |
| 6,450,407 | B1 | 9/2002 | Freeman et al. |
| 6,473,500 | B1 | 10/2002 | Risafi et al. |
| 6,484,147 | B1 | 11/2002 | Brizendine et al. |
| 6,493,685 | B1 | 12/2002 | Ensel et al. |
| 6,594,640 | B1 | 7/2003 | Postrel |
| 6,615,189 | B1 | 9/2003 | Phillips et al. |
| 6,631,358 | B1 | 10/2003 | Ogilvie |
| 6,697,785 | B2 | 2/2004 | Dixon, III et al. |
| 6,748,365 | B1 | 6/2004 | Quinlan et al. |
| 6,865,544 | B1 | 3/2005 | Austin |
| 6,941,279 | B1 | 9/2005 | Sullivan |
| 6,965,868 | B1 | 11/2005 | Bednarek |
| 6,973,478 | B1 | 12/2005 | Ketonen et al. |
| 7,072,851 | B1 | 7/2006 | Wilcox et al. |
| 7,392,224 | B1 | 6/2008 | Bauer et al. |
| 7,516,883 | B2 | 4/2009 | Hardesty et al. |
| 7,542,921 | B1 | 6/2009 | Hildreth |
| 7,571,849 | B2 | 8/2009 | Burke |
| 7,580,877 | B1 | 8/2009 | Argenbright |
| 7,606,760 | B2 | 10/2009 | Hutchison et al. |
| 7,627,531 | B2 | 12/2009 | Breck et al. |
| 7,765,132 | B2 | 7/2010 | Wilson et al. |
| 7,818,253 | B2 | 10/2010 | Phillips et al. |
| 2001/0031456 | A1 | 10/2001 | Cynaumon et al. |
| 2001/0032134 | A1 | 10/2001 | Hardesty |
| 2002/0023026 | A1 | 2/2002 | Carroll et al. |
| 2002/0099601 | A1 | 7/2002 | Farrell |
| 2003/0014313 | A1 | 1/2003 | Brizendine et al. |
| 2003/0023491 | A1 | 1/2003 | Brizendine et al. |
| 2003/0033246 | A1 | 2/2003 | Slater |
| 2003/0061093 | A1 | 3/2003 | Todd |
| 2003/0083930 | A1 | 5/2003 | Burke |
| 2007/0050264 | A1 | 3/2007 | Lewis |
| 2009/0319353 | A1 | 12/2009 | Palmeri |

FOREIGN PATENT DOCUMENTS

| | | |
|---|---|---|
| CA | 2177448 A1 | 12/1996 |
| WO | WO 93/13488 A1 | 7/1993 |
| WO | WO 94/04979 A1 | 3/1994 |
| WO | WO 97/46961 A1 | 12/1997 |
| WO | WO 99/12103 A2 | 3/1999 |
| WO | WO 00/14665 A1 | 3/2000 |

OTHER PUBLICATIONS

"N.J. Bank to Offer Card That Boosts College Savings," The American Banker, Jul. 14, 1998, Copyright 1998 American Banker, Inc., 2 pages total.

"Relationship Cards: Heroic Means of Saving," Future Banker (an American Banker publication), American Banker vol. 162, No. 109, Jun. 9, 1997, Copyright American Banker Inc.,—Bond Buyer 1997 (2011 Factiva, Inc.), 5 pages total.

BizRate: Press release posted at www.bizrate.com entitled "BizRate. com turns online shopping on its head and gives power to the people", dated Oct. 21, 1999.

Bulkeley, William M., "How to keep buying and still save for college", Wall Street Journal (Eastern Edition), Jul. 12, 2000, p. B.1.

Caudron, Shari, "Brand loyalty: Can it be revived?", Industry Week, v. 242 n. 7, Apr. 5, 1993, pp. 11-14.

Complaint, filed Jul. 11, 1983, in the United States District Court for the Southern District of New York (83 Civ. 5163) by Savings Plus Systems, Inc. against Goldome Bank for Savings and BSB Save System, Inc., and 'Plus Card' Card Cash Discount System Implementation Agreement, 58 pages total.

Definition of "register" (v), Merriam-Webster's Online Dictionary, accessed at http://www.search.eb.com/dictionary, Sep. 29, 2004.

Ebates: Press release posted at www.ebates.com entitled "Roundpeg and Think New Ideas collaborate to deliver next-generation Internet shopping portal", dated May 3, 1999.

Higgins, Kevin T. "The mass market cracks up", Credit Card Management, Mar. 1993, p. 58.

Mulrean, Jennifer, "You can save for college by spending", MSN Money, published after Jan. 2, 2004 and downloaded on Mar. 1, 2005 from http://moneycentral.msn.com/content/CollegeandFAmily/Savingforcollege/P33739.asp.

Transmedia Network Inc., "Annual Report Pursuant to Section 13 or 15(d) of the Securities Exchange Act of 1934", SEC Washington DC, p. 4; Jan. 6, 2000; downloaded from http://www.sec.gov/Archives/edgar/data/78536/0000950170-00-000012.txt.

University of Michigan Journal of Law Reform note entitled "A Commerce Clause Challenge to New York's Tax Deduction for Investment in Its Own Tuition Savings Program", dated Winter, 1999, 22 pages total.

"A Heroic Effort to Enhance Store Cards", Credit Card Management—CARDLYTICS-0000734.

"Be Your Own Financial Hero—Marietta man has found a way to turn spending into savings", Marietta Daily Journal, No. 159, Jun. 9, 1997—CARDLYTICS-0000732-733.

"Card Sharp—Entrepreneurs find a way to play hero.", Entrepreneur, p. 30, Aug. 1998—CARDLYTICS-0000737.

"Cardlytics Defendant's Preliminary Invalidity Contentions" filed in the United States District Court for the Middle District of Tennessee, Case No. 3:11-CV-00069 (M.D. Tenn.) pp. 1-20 with attachments (538 pages in total).

"Coalition Marketing with HERO Proposed Business Relationships", CARDLYTICS-0000809.

"Customers are Your Best Return on Investment", CARDLYTICS-0000810.

"Defendants First Horizon National Corporation, First Tennessee Bank National Association, Branch Banking and Trust Co., Comerica Bank, Fiserv, Inc., and Affinity Solutions, Inc.'s Prelimi- (56) References Cited

OTHER PUBLICATIONS nary Invalidity Contentions" filed in the United States District Court for the Middle District of Tennessee, Case No. 3:11-cv-00852 (M.D. Tenn), pp. 1-77.
"Defendants SunTrust Banks, Inc., SunTrust Bank, Vesdia Corporation and Cartera Commerce, Inc.'s Preliminary Invalidity Contentions and ClaimCharts" filed in the United States District Court for the Middle District of Tennessee, Case No. 3:11-CV-00069 (M.D. Tenn.) pp. 1-13, with attachments (444 pages in total).
"Directory of Local HERO Merchants", CARDLYTICS-0000815-816.
"Get Magnetized"—CARDLYTICS-0000742.
"Goldome Charged wtih Trying to Monopolize Cash Discount System", American Banker, Jul. 26, 1983.
"HERO 1997 Annual Report", CARDLYTICS-0000856-869.
"HERO 1998 Annual Report", CARDLYTICS-0000825-839.
"HERO 1999 Annual Report", CARDLYTICS-0000840-855.
"HERO card can be a (life)saver" Norwich Bulletin, CARDLYTICS-0000721.
"HERO Health Education Retirement Organization", CARDLYTICS-0000743-0000806.
"HERO Program Terms and Conditions", CARDLYTICS-0000741.
"HERO, Inc. Executive Summary" CARDLYTICS-0000720.
"HeroMall.com", Health-Education-Retirement-Organization, Inc., CARDLYTICS-0000807.
44 "HeroMall.com", Health-Education-Retirement-Organization, Inc., CARDLYTICS-0000870-871.
"How to Become a HERO Merchant", CARDLYTICS-0000740.
"Preliminary Invalidyt Contentions of Ally Financial Inc.; Ally Bank; Fifth Third Bank; and EDO Interactive, Inc." filed in the United States District Court for the Middle District of Tennessee, Case No. 3:11-cv-0852(M.D. Tenn.) pp. 1-9 with attachments (430 pages in total).
"Provident Launches Frequent Shopper Program Meritvalu Enables Merchants to Execute Relationship Marketing", PR Newswire, Aug. 1, 1996.
"Relationship Cards Heroic Means of Saving" FutureBanker, Jun. 1997, p. 20—CARDLYTICS-0000728.
"Relationship Cards Heroic Means of Saving" FutureBanker, Jun. 1997, p. 20—CARDLYTICS-0000731.
"Relationships Cards-Heroic Means of Saving", FutureBanker, Jun. 1997, p. 20, CARDLYTICS-0000808.
"The Electronic Briefing Service for Credit and Debit Card Executives", Cardfax, Apr. 28, 1997—CARDLYTICS-0000729-730.
"The HERO Goal FundingCard Allows Merchants to Reward You for Shopping in Their Stores", CARDLYTICS-0000811-814.
"The HERO Program", CARDLYTICS-0000824.
"Valu' Card", CardTrak Online, Feb. 6, 1997.
COLLOGUY Staff, "MeritValu Throws in the Towel", vol. 7, Issue 2, Apr. 1, 1999.
Evelina Shmukler, "Swipe the card, get a discount, bank the savings", Atlanta Business Chronicle, Jul. 9-15, 1999—CARDLYTICS-0000735 and 0000738-739.
HERO promotional material, CARDLYTICS-0000817-823.
Jeff McKinney, "Provident becoming a banking supermarket", The Cincinnati Enquirer, Aug. 10, 1997.
Jeff McKinney, "Provident on the hunt—Chief seeking non-bank firms", The Cincinnati Enquirer, Dec. 11, 1997.
Jeff McKinney, "Provident to phase out MeritValu", The Cincinnati Enquirer, Oct. 14, 1998.
John Cunniff "A savings card gets introduced to consumers"; Olean Times Herald Apr. 28, 1997; CARDLYTICS-0000724.
John Cunniff "Hero card actually saves user money" Coeur D'Alene Press, Apr. 27, 1997, CARDLYTICS-0000722-723.
John Cunniff "Introducing the Savings Card", The Associated Press; 1997—CARDLYTICS-0000725-727.
John Cunniff, "A Plastic Card That Helps You Save as You Spend", The Associated Press, 1999—CARDLYTICS-0000736.
Lisa Fickenscher, "N.J. Bank to Offer Card That Boosts College Savings", American Banker, Jul. 14, 1998.

METHODS AND SYSTEMS FOR PROVIDING A MERCHANT FUNDED INCENTIVE REBATE OR AWARDS PROGRAM

This application is a continuation of application Ser. No. 13/300,167 filed on Nov. 18, 2011, now U.S. Pat. No. 8,156,000, which is a divisional of application Ser. No. 13/033,208 filed on Feb. 23, 2011, now U.S. Pat. No. 8,065,183, which is a divisional of application Ser. No. 12/649,903 filed on Dec. 30, 2009, now U.S. Pat. No. 7,899,704, which is a continuation of application Ser. No. 12/347,136 filed on Dec. 31, 2008, now U.S. Pat. No. 7,653,572, which is a continuation of application Ser. No. 09/703,562 filed on Nov. 1, 2000, now U.S. Pat. No. 7,499,872, which claims priority to provisional application Ser. No. 60/208,727, filed Jun. 2, 2000.

FIELD OF THE INVENTION

The present invention relates to facilitating retail transactions between participating enrolled members and participating merchants who fund incentive rebates or awards to said members.

BACKGROUND OF THE INVENTION

The dramatically increasing costs of higher education have unfortunately put the benefits of a higher education out of the reach of many people. However, the value of higher education has never been more evident. For example, in today's technology driven economies many job opportunities require advanced scientific and technical training. Indeed, a recent study conducted by the U.S. Labor Department estimated that in the year 2000, 85% of the nation's jobs will require education or training above the high school level. Moreover, as international commercial, political, and cultural ties continue to deepen in the present atmosphere of globalization, the benefits of a well rounded education become ever more apparent.

Individuals with post-secondary degrees typically receive higher salaries than those individuals without such degrees. According to a recent study conducted by the College Board, the lifetime earnings of individuals with a bachelor's degree are 51% higher than those with only a high school diploma. Similarly, the average annual salary for a college graduate is currently $59,048, compared with $33,779 for those individuals with only a high school diploma.

Although, Americans consistently rank the ability to pay for their child's college education as one of their primary concerns, the average debt load carried by recent college graduates continues to soar each year. According to Provident Mutual.com, 87% of current students say that college costs will soon be "out of reach," 52% say that any additional debt will put them in serious risk, and 38% say that college is "not affordable" right now. Thus, while higher education is emerging as a critical factor to future success in the job market, the financial burden of obtaining a degree is rising dramatically. A study by the College Board determined that the current average price (tuition plus room and board) of one year at a private four-year university was $20,273 for the 1998-1999 school year. For the same time period at a public post secondary institution, the price was $7,773. Recent college-cost increases have easily outpaced the U.S. economy's overall inflation rate in the past ten years, and the National College Resource Association estimates that by the year 2017 one year at a private four year university will cost $61,251, while one year at a public institution will be $28,787.

For today's newborn, experts estimate that parents must save approximately $216 per month for 18 years to cover the entire four year tuition costs at a public institution. In 1997, the U.S. Census Bureau reported that the median income for a four-person family was $53,350, indicating that college saving for two children would require 10% of pre-tax income for a four-person family.

For families unable to save sufficient funds for college expenses, student borrowing has emerged as the next best solution. The current level of college borrowing in the United States is approaching $40 billion. Student borrowing in the last five years has exceeded the growth rate of college costs by three times and personal income by four times. According to ProvidentMutual.com, two-thirds of borrowers claim that their student loans represent a "major financial hardship."

As a result of the increasing costs associated with higher education, in the last five years there has been a proliferation of government sponsored and private programs designed to help parents save for their children's college education. Recognition of the financial hardships related to saving or borrowing for college has led many families to seek solutions to the problem, which in turn has created an emerging industry of college savings options. State created tuition savings plans are currently available in forty-six states, and in less than five years have amassed in excess of $7 billion in invested assets. The federal government has also created "Educational IRA's" and other tax incentives related to education investments. Most major brokerage firms and mutual funds now market programs designed to encourage parents to save for college expenses, and have been extremely successful in attracting investors.

Some drawbacks of these tuition savings programs include obligatory contributions, large amounts of after tax income needed to fund the programs, limitations on school selection offered to the student, restrictions on the funds at maturation, and the potential of program cancellations without guarantee of admittance. Since most state plans require contributors to sign binding contracts that lock in a payment schedule, such plans therefore obligate contributors, and require them to make a special effort to make payments. Moreover, the various private tuition savings programs also require contributors to make special financial sacrifices to save for tuition costs.

What is needed are methods and systems for accumulating monies for funding a college tuition that do not place a significant financial burden on the user.

DESCRIPTION OF THE FIGURES

The following figures form part of the present specification and are included to further demonstrate certain aspects and embodiments of the present invention. The invention may be better understood by reference to one or more of these figures in combination with the detailed description of specific embodiments presented herein.

SUMMARY OF THE INVENTION

The present invention relates to methods and systems for providing/managing a rebate program for funding a member designated account, such as a higher education account, by accumulating and managing merchant rebates.

To facilitate understanding of the invention, a number of terms and phrases are defined below:

As used herein, the term "higher education account" refers to a financial account that is used to fund or pay for post-high school (i.e., post-secondary) education or contribute to a higher education institution (e.g., college, university, or trade school). Examples of higher education accounts include, but are not limited to student loan payment accounts, educational IRAs, college fund savings accounts, college charitable contribution accounts, and state 529 accounts. Funds may be held in the accounts (e.g., to collect interest) before being transferred to a higher educational institution or student loan creditor.

As used herein, the term "member" refers to a person registered with or belonging to an organization (e.g., TuitionFund.com).

As used herein, the term "money manager" refers to a professional financial management group. It is contemplated that, examples of "money managers" include, but are not limited to, organizations such as Charles Schwab, Fidelity, American Express, and Merrill Lynch.

As used herein, the term "rebate network manager" refers to an entity (e.g., InfoSpace) that correlates purchases made from merchants belonging to a network with rebates offered in conjunction with the purchases. In some cases, the "rebate network manager" debits a merchant account and credits an existing account (e.g., higher education account).

As used herein, the term "tracking entity" refers to an entity (e.g., Linkshare.com or Befree.com) that tracks and records purchases made by a consumer from merchants associated with a tracking entity.

As used herein, the term "on-line," when used in relation to a merchant, refers to a web page or collection of web pages (e.g., a web site) where goods or services are for sale.

As used herein, the terms "on-site" and "point of sale," when used in relation to a merchant site, refers to a physical place of business where goods and services are offered for sale.

As used herein, the term "processor" refers to a device that performs a set of steps according to a program.

As used herein, the term "computer memory device" refers to any data storage device that is readable by a computer, including, but not limited to, hard disks, magnetic (floppy) disks, compact discs, zip drives, and magnetic tape.

As used herein, the term "rebate" refers to a return of part of a payment.

As used herein, the term "client-server" refers to a model of interaction in a distributed system in which a program at one site sends a request to a program at another site and waits for a response. The requesting program is called the "client," and the program which responds to the request is called the "server." In the context of the World Wide Web (discussed below), the client is a "Web browser" (or simply "browser") which runs on a computer of a user; the program which responds to browser requests by serving Web pages is commonly referred to as a "Web server."

As used herein, the term "hyperlink" refers to a navigational link from one document to another, or from one portion (or component) of a document to another. Typically, a hyperlink is displayed as a highlighted word or phrase that can be selected by clicking on it using a mouse to jump to the associated document or documented portion.

As used herein, the term "hypertext system" refers to a computer-based informational system in which documents (and possibly other types of data entities) are linked together via hyperlinks to form a user-navigable "web."

As used herein, the term "Internet" refers to a collection of interconnected (public and/or private) networks that are linked together by a set of standard protocols (such as TCP/IP and HTTP) to form a global, distributed network. While this term is intended to refer to what is now commonly known as the Internet, it is also intended to encompass variations which may be made in the future, including changes and additions to existing standard protocols.

As used herein, the terms "World Wide Web" or "web" refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols which may be used in place of (or in addition to) HTML and HTTP.

As used herein, the term "web site" refers to a computer system that serves informational content over a network using the standard protocols of the World Wide Web. Typically, a Web site corresponds to a particular Internet domain name, such as "TuitionFund.com" and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users.

As used herein, the term "HTML" refers to HyperText Markup Language which is a standard coding convention and set of codes for attaching presentation and linking attributes to informational content within documents. During a document authoring stage, the HTML codes (referred to as "tags") are embedded within the informational content of the document. When the Web document (or HTML document) is subsequently transferred from a Web server to a browser, the codes are interpreted by the browser and used to parse and display the document. Additionally in specifying how the Web browser is to display the document, HTML tags can be used to create links to other Web documents (commonly referred to as "hyperlinks").

As used herein, the term "HTTP" refers to HyperText Transport Protocol which is the standard World Wide Web client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET, causes the server to return the document or file located at the specified URL.

As used herein, the term "URL" refers to Uniform Resource Locator which is a unique address which fully specifies the location of a file or other resource on the Internet. The general format of a URL is protocol://machine address: port/path/filename. The port specification is optional, and if none is entered by the user, the browser defaults to the standard port for whatever service is specified as the protocol. For example, if HTTP is specified as the protocol, the browser will use the HTTP default port of 80.

As used herein, the term "cookies" refers to a technology that enables a Web server to retrieve information from a user's computer that reveals prior browsing activities of the user. The informational item stored on the user's computer (typically on the hard drive) is commonly referred to as a "cookie." Many standard Web browsers support the use of cookies.

As used herein, the term "PUSH technology" refers to an information dissemination technology used to send data to users over a network. In contrast to the World Wide Web (a "pull" technology), in which the client browser must request a Web page before it is sent, PUSH protocols send the informational content to the user computer automatically, typically based on information pre-specified by the user.

DETAILED DESCRIPTION OF THE INVENTION

The present invention utilizes certain aspects of the World Wide Web to help pay for or fund higher education or to allow charitable contributions to higher education institutions. Methods and systems are provided for generating funds for these uses through a rebate network. These methods and systems are described in more detail below in the following sections: I) Overview of The Types of Members' Funds and Accounts; II) Overview of Existing Registered Member Login and New Member Registration; III) Overview of the Full Member On-line Privileges/Services/Links; and IV) Preferred Merchant/Member Rebate Sales Schemes [A. On-line Merchants Associated with the Rebate Network Manager; B. Merchants Not Registered with a Rebate Network Manager, but Associated with a Tracking Entity; and C. Off-line Merchants]. The methods and systems according to the present invention will be described with reference to FIGS. 1-6.

I. Overview of the Types of Members' Funds and Accounts

Figure 1:
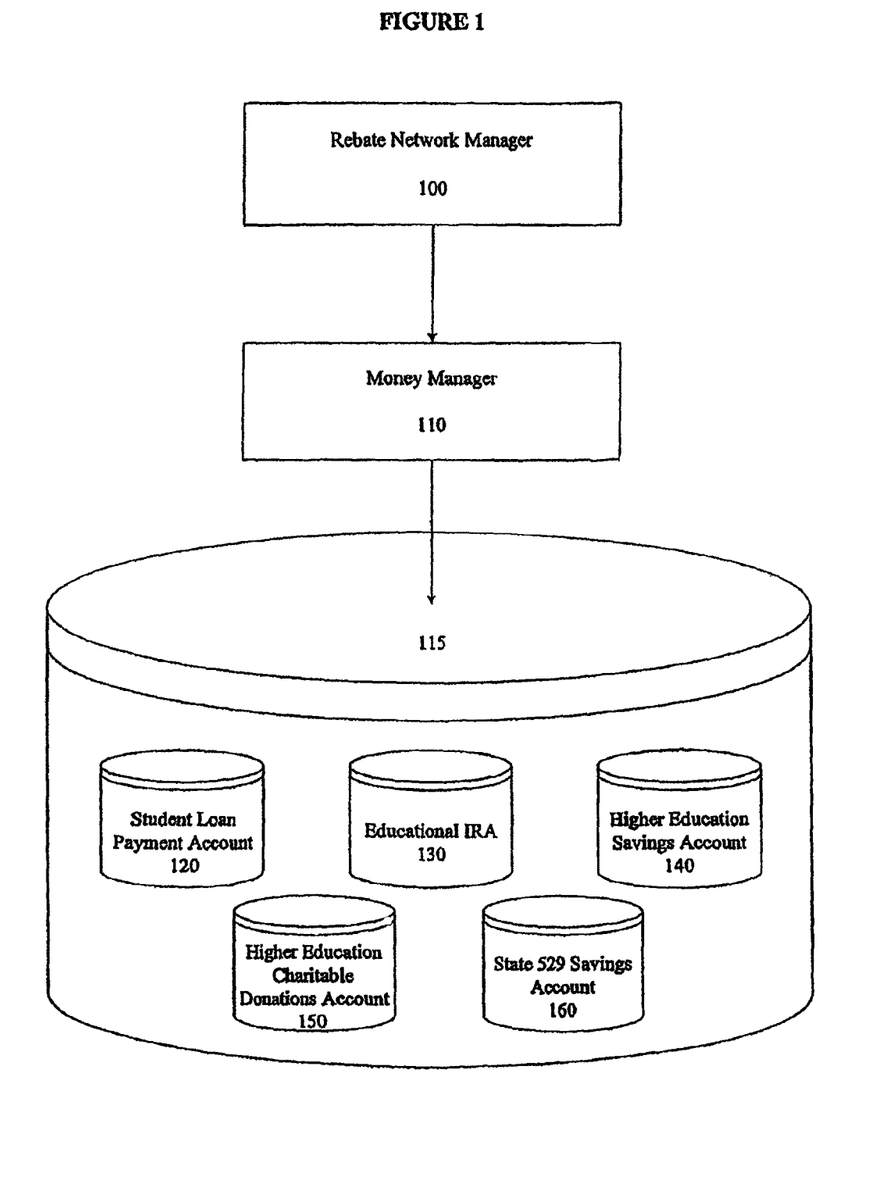
FIG. 1 illustrates the various funds and accounts available to registered members for holding member rebates.

FIG. 1 is a flow chart illustrating the flow of member rebate monies due a member from purchases consummated through participating on-line or point of sale merchants. In a preferred embodiment, the rebate monies earned by a member by participating in the TuitionFund.com program are centrally accumulated by a Rebate Network Manager 100. The rebate monies earned by the member are then directed to a professional Money Manager 110. The professional Money Manager 110 may be a licensed financial agent, broker, or any firm offering financial management and brokerage services. Examples of contemplated Money Managers 110 might include, but are not limited to, the following firms offering financial services: American Express, Charles Schwab, Fidelity, or Merrill Lynch. The Money Manager 110 allocates the rebate monies earned by a particular member according to the desires of that member.

In preferred embodiments, any interest, dividends, stock splits, or the like earned by the member on any of a member's various investment fund and account options available 115 are reinvested according the to the member's desires in any of the member's various investment fund and account options 115, as allowed by law. In certain other embodiments, any investment principal, interest, dividends, stock splits, or the like, earned by the member on any of a member's various investment fund and account options 115 are disbursed directly to member's higher education creditors. In still further embodiments, any investment principal, interest, dividends, stock splits, or the like, earned by the member on any of a member's various investment fund and account options 115 are disbursed directly to the member earning such accretions, as allowed by law. In yet other embodiments, any investment principal, interest, dividends, stock splits, or the like, earned by the member on any of a member's various funds and accounts 115, are disbursed to another member's or other members' various funds and accounts 115.

In some preferred embodiments, as allowed by law, a member may elect to fund or partially fund any of the various investment fund and account options 115 available with monies other than those obtained by rebates from participating merchants. Similarly, in other preferred embodiments, a nonmember may elect to fund or partially fund any of the various investment fund and account options 115 available to members.

In preferred embodiments, members may select from a number of available member investment fund and account options 120, 130, 140, 150, and 160 established for funding a higher education. In preferred embodiments, information, including balances, concerning the various member investment fund and account options 115 is stored or recorded in computer readable form in various data storage devices. Examples of data storage devices for storing and recording member fund and account 115 information include, but are not limited to, magnetic media including, disks, tapes, and the like, optical storage media including, compact disk (CD) format, digital video disk (DVD) format, or the like, a processing device's random access memory (RAM), or a processing device's read only memory (ROM), etc. The present invention also contemplates that member investment fund and account options 115 balances and interest earned information will be provided and/or accessible regularly and periodically to each individual member. The present invention also contemplates providing periodic and regular member investment fund and account 115 balance and interest earned information to all entitled government and financial agencies, higher education creditors, and educational institutions as required by law. In some embodiments, member investment fund and account options 115 balance and interest earned information will be provided to the recipient by any acceptable manner, (e.g., electronic mail, computer readable data, type-written or printed, etc.).

The present invention contemplates that the members' accumulated rebate monies held in their various investment fund and account options 115 be disbursed to the member's various higher education creditors. Similarly, the present invention also contemplates that member funds can be distributed directly to an institution or institutions of higher education.

In still other embodiments, the member may specify that an amount from their accumulated earned rebate monies in their various investment fund and account options 115 be disbursed for the benefit of another's higher education. Accordingly, in some particular embodiments, a member may have one or more other members contributing earned rebate monies to their funds and accounts 115. Thus, the invention contemplates that some members may earn rebate monies either exclusively or partially for the benefit of another member's various investment fund and account options 115.

In certain embodiments, the various investment options available to the member 115 may include Student Loan Payment Accounts 120. The present invention contemplates that available funds and accounts under the Student Loan Payment Account 120 option may comprise interest bearing annuities, mutual funds, bond funds, index funds, money market accounts, or any other investment grade security or equity, and the like. In preferred embodiments, member rebate monies accumulating in the available funds and accounts under the Student Loan Payment Account 120 option are managed by the professional Money Manager 110 on an on-going basis.

In particularly preferred embodiments, member rebate monies accumulated in the various available funds and accounts of the Student Loan Payment Account 120 are disbursed directly by the Money Manager 110 to the member's various higher education creditors. The present invention, however, is not limited by the nature of the member's higher education creditors. Indeed, the present invention contemplates, that the member may be indebted for higher educational expenses to banks and other financial institutions, commercial loan companies, various state and federal government lending agencies, and private organizations. In particular, the present invention contemplates that the higher educational expenses owed by members may comprise expenses for tuition and fees, room and board, and any other expenses incidental to obtaining a higher education. The present invention also contemplates that member rebate monies held in member Student Loan Payment Accounts 120 may be used by the member to pay down existing higher education loans and debts. Additionally, the present invention contemplates the use of member funds to pay-down the interest that is accumulating while student loan payments are deferred (i.e., before graduation).

In certain other embodiments, the various investment fund and account options 115 available to the member may include Educational IRAs 130. The present invention contemplates that available funds and accounts under the Educational IRAs 130 option may comprise interest bearing mutual funds, bond funds, index funds, money market accounts, or any other investment grade security or equity allowable by law. In preferred embodiments, the member Education IRAs 130 are managed by the professional Money Manager 110. In particularly preferred embodiments, when the member Educational IRAs 130 are managed by a professional Money Manager 110, the Money Manager 110 will provide the member with appropriate guidance and oversight of each member Educational IRAs 130 and additionally be to able provide all relevant accountings. In still other preferred embodiments, the Money Manager 100 managing the member's rebate monies accumulated in the funds and accounts of the member's Educational IRAs 130, will make the necessary disbursements to higher educational institutions, and other higher education creditors of the member.

In still other embodiments, a member may elect from the various investment funds and account options available 115 to have the Money Manager 110 direct their earned rebate monies into a Higher Education Savings Fund 140. The present invention contemplates that the monies directed into a member's Higher Education Savings Fund 140 may be held in a number of various funds and accounts. In some embodiments, the various investment fund and account options that may comprise a member Higher Education Savings Fund 140 include money market accounts, regular savings accounts, bond funds, stock index funds, mutual funds, annuities, and any other investment grade security or equity, as allowed by law. In preferred embodiments, the Money Manager 110 manages and advises the member on investment strategies and opportunities available to the member for accumulating interest on their Higher Education Savings Accounts 140. In particularly preferred embodiments, the Money Manager 110 may directly disburse monies regularly and periodically from the member's various funds and accounts comprising their Higher Education Savings Account 140 to the member's higher education creditors. As seen above, the present invention is not limited by the nature of the member's higher education creditors, nor by the nature of the member's debt to a particular higher education creditor. In still other embodiments, the monies accumulated in the funds and accounts of the member's Higher Education Savings Accounts 140 are allowed to accrete for a period of time until they are disbursed.

In additional embodiments, a member may elect from the various investment funds and account options 115 to have the Money Manager 110 direct their earned rebate monies into a Higher Education Charitable Donations Account 150. In some embodiments, the various funds and accounts that may comprise a member Higher Education Charitable Donations Account 150 include money market accounts, regular savings accounts, bond funds, stock index funds, mutual funds, annuities, and any other investment grade security or equity, as allowed by law. In a preferred embodiment, a professional Money Manger 110 manages the monies directed into the various funds and accounts of a member's Higher Education Charitable Donations Account 150. In a particular embodiment, the member's earned rebate monies directed to the funds and accounts available under the Higher Education Charitable Donations Account 150 are held without commingling with those monies of other members held for like purposes. However, in other preferred embodiments, an individual member's earned rebate monies held in the various investment fund and account options under a Higher Education Charitable Donations Account 150 are aggregated with those of other member's electing to direct their earned rebate monies into Higher Education Charitable Donations Accounts 150.

In particularly preferred embodiments, the monies accumulated in the various funds and accounts options available under Higher Education Charitable Donations Accounts 150 are disbursed regularly or periodically to one or more institutions of higher education. The present invention contemplates that such disbursements to institutions of higher education may occur periodically every month to every 12 months or longer. In other embodiments, the disbursements of monies held in the various funds and accounts available under Higher Education Charitable Donations Account 150 are made when the monies accrete to a predetermined amount. Alternatively, the disbursements of monies held in the various funds and accounts available under Higher Education Charitable Donations Account 150 may occur at the behest of the beneficiary institution of higher education. Moreover, the present invention contemplates that disbursements made from a fund or account held under the Higher Education Charitable Donations Account 150 may include interest and principal in any ratio or amount.

In still other embodiments, a member may elect from the various investment funds and account options available 115 to have the Money Manager 110 direct their earned rebate monies into a State 529 Savings Account 160. The present invention contemplates that the monies directed into a member's State 529 Savings Account 160 may be held in a number of various funds and accounts as allowed by law. In preferred embodiments, the professional Money Manager 110 directly disburses the funds that are deposited into a member's State 529 Savings Account 160. In still other preferred embodiments, the Money Manager 110 provides periodic investment advice and management services over the member's State 529 Savings Account 160 monies such that the accumulated monies accrete in value.

Overview of Existing Registered Member Login and New Member Registration

Figure 2:
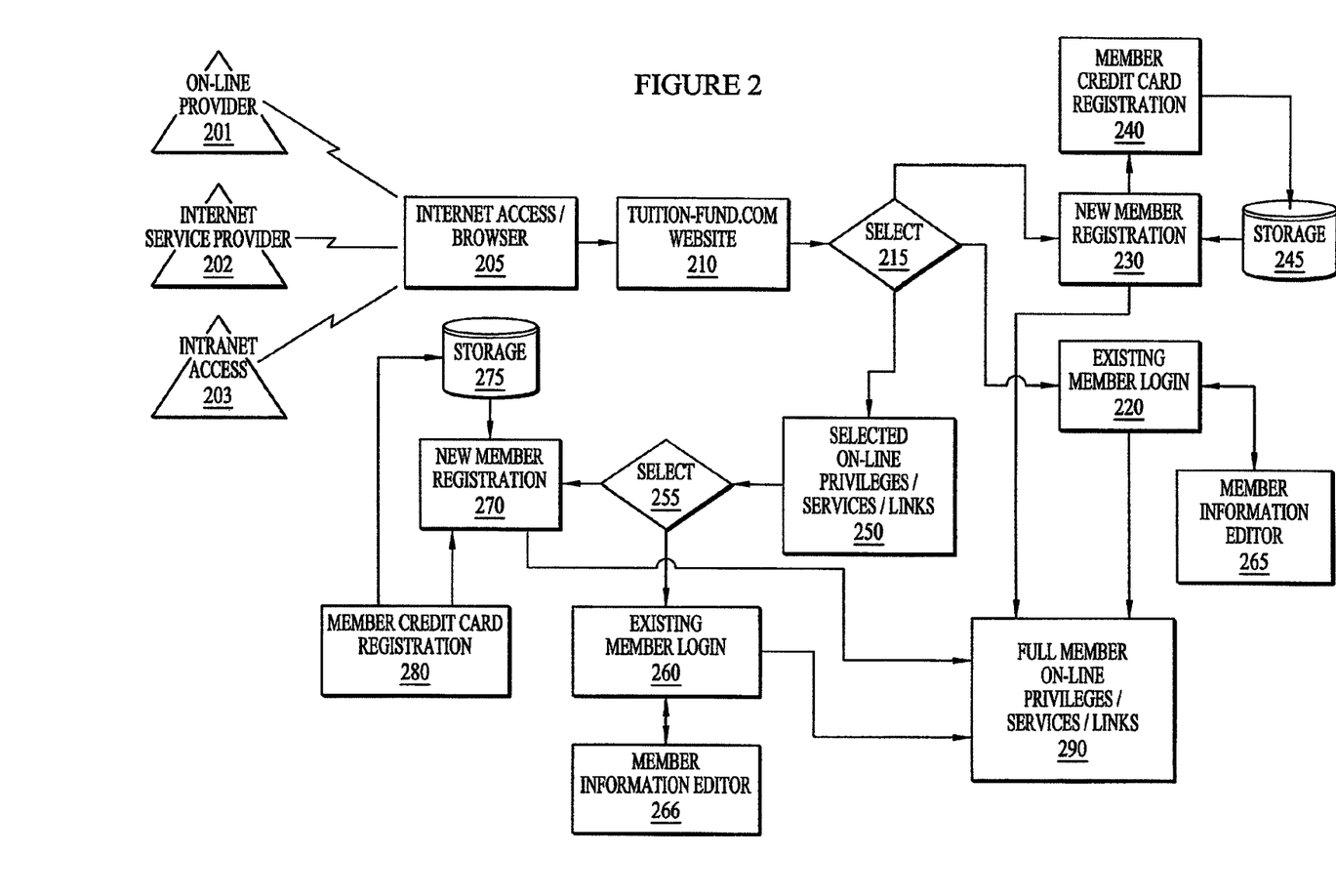
FIG. 2 provides an overview of the registered member and non-registered user access to the TuitionFund.com Web Site.

FIG. 2 is a flow chart briefly illustrating the options available to both registered members and un-registered users accessing the TuitionFund.com Web Site (See FIG. 2, at 210).

In particular, FIG. 2 briefly illustrates certain embodiments of the present invention highlighting the options available to existing registered members, and those wishing to become registered members, as well as those simply browsing the Web Site.

The present invention contemplates that Internet Access 205 to the TuitionFund.com Web Site 210 can be established through any number of methods for connecting to the Internet and visiting a Web site. For example, Internet Access 205 can be achieved through an On-Line Service Provider 201 (e.g., America On Line [AOL], or CompuServe), through an Internet Access/Service Provider 202 (e.g., AT&T Worldnet, EarthLink, or MindSpring), or alternatively through an Intranet Access 203. Once a communications link to the Web has been established, the user may then proceed to their chosen Internet Browser 205 (e.g., Netscape Navigator, or Microsoft, Internet Explorer) in order to access or "visit" the TuitionFund.com Web Site 210. The present invention is not limited by the means employed to establish a connection to the Internet, nor by the particular device used to establish the connection.

In preferred embodiments, after accessing the TuitionFund.com Web Site 210, the individual is presented with a number of available services and options offered on the Web Site 210. Thus, the user must Select 215 from the available service and options available at the TuitionFund.com Web Site 210. In some embodiments, the user, if an Existing Registered Member 220, may chose to immediately login and proceed to the Full Member On-Line Privileges/Services/Links 290 pages. Alternatively, in some other embodiments, the user, if an Existing Registered Member 220, may proceed to the Existing Member Account & Personal Information Editor 265. In preferred embodiments, Existing Registered Members 220, may alter their existing member profiles, credit or debit card account information, or make inquires/transfers/disbursements from their various rebate accounts and funds (See FIG. 1, at 115) in the Existing Member Account & Personal Information Editor 265. One skilled in the art will appreciate the security and confidentiality safeguards necessary for the safe operation of this area of the present invention, as well as the overall operation of the methods and systems of the present invention.

In other embodiments, the user, if not previously registered, may Select 215 to proceed to New Member Registration 230. The present invention contemplates that New Member Registration 230 may involve providing certain member identifying information to the TuitionFund.com Web Site 210. For example, the new member may be required to proceed to a Member Credit Card Registration 240 page. At the Member Credit Card Registration 240 page, the new member can specify the account numbers they wish to have charged for their various on-line purchases at the Full member On-line Privileges/Services/Links 290 pages. The member may also desire to register other accounts for their off-line purchase, or use the same accounts. In preferred embodiments, members can register their e.g., credit cards, debit cards, checking account numbers, etc. Registration information may be saved in computer readable memory 245 at the TuitionFund.com Web Site 210 or at another data storage point (e.g., the Rebate Network Manager) or both. Moreover, the present invention contemplates that information required during New Member Registration 230 may be further transmitted to other entities involved in awarding member rebates, or for other purposes (See e.g., Rebate Network Manager [FIG. 1, at 100], or Money Manager [FIG. 1, at 110]). In other preferred embodiments, the point of New Member Registration 230, may further comprise selecting from the various investment account and funds options available for depositing the rebate monies earned as a TuitionFund.com member (See, FIG. 1, at 115). Accordingly, the Member Registration page 240 may provide any information necessary for selecting from the funds and account options available to registered members (See, FIG. 1, at 115). Once the previously unregistered user becomes a registered member, they may proceed directly to the Full Member On-line Privileges/Services/Links pages 290.

In other embodiments, after accessing the TuitionFund.com Web Site 210 and when faced with Selecting 215 desired pages or links, the user may proceed directly to Selected On-line Content Pages/Services/Links 250. In particularly preferred embodiments, the Selected On-line Content Pages/Services/Links 250 may comprise all the pages, services, and links available to registered members, except links to merchants participating in the TuitionFund.com rebates methods and systems. In preferred embodiments, once a user has accessed the Selected On-line Content Pages/Services/Links page 250, the user may proceed to the Existing Member Login page 260, and from this page the member may proceed to the Full Member On-Line Privileges/Services/Links 290 pages. Alternatively, in some embodiments, the user may proceed to the Existing Member Account & Personal Information Editor 266. In preferred embodiments, Existing Registered Members 260 may alter their existing member profiles, credit or debit card account information, or make inquires/transfers/disbursements from their various rebate investment accounts and funds (See FIG. 1, at 115).

In other embodiments, the user, if not previously registered, may Select 255 to proceed to New Member Registration 270. The present invention contemplates that New Member Registration 270 may involve providing certain member identifying information to the TuitionFund.com Web Site 210. For example, the new member may be required to proceed to a Member Credit Card Registration 280 page. At the Member Credit Card Registration 280 page, the new member can specify the account numbers they wish to use for their various on-line purchases at the Full Member On-line Privileges/Services/Links 290 pages. In preferred embodiments, members can register their e.g., credit cards, debit cards, checking account numbers, etc. Registration information may be saved in computer readable memory 275 at the TuitionFund.com Web site or at another point of data storage (e.g., the Rebate Network Manager) or both. Moreover, the present invention contemplates that information required during New Member Registration 270 may be further transmitted to other entities involved in awarding member rebates, or for other purposes (See e.g., Rebate Network Manager [FIG. 1, at 100], or Money Manager [FIG. 1, at 110]). In other preferred embodiments, the point of New Member Registration 270, may further comprise, selecting from the various investment account and fund options available for depositing the rebate monies earned as a TuitionFund.com member (See, FIG. 1, at 115). Accordingly, the Member Credit Card Registration page 270 may provide any information necessary for selecting from the investment fund and account options available to registered members (See, FIG. 1, at 115). Once the previously unregistered user becomes a registered member, they may proceed to the Full Member On-line Privileges/Services/Links pages 290.

In some embodiments, nonmembers may have access to all features and services, including links to merchants, as registered members, except that nonmembers will not earn rebates on their purchases.

Overview of the Full Member On-Line Privileges/Services/Links

Figure 3:
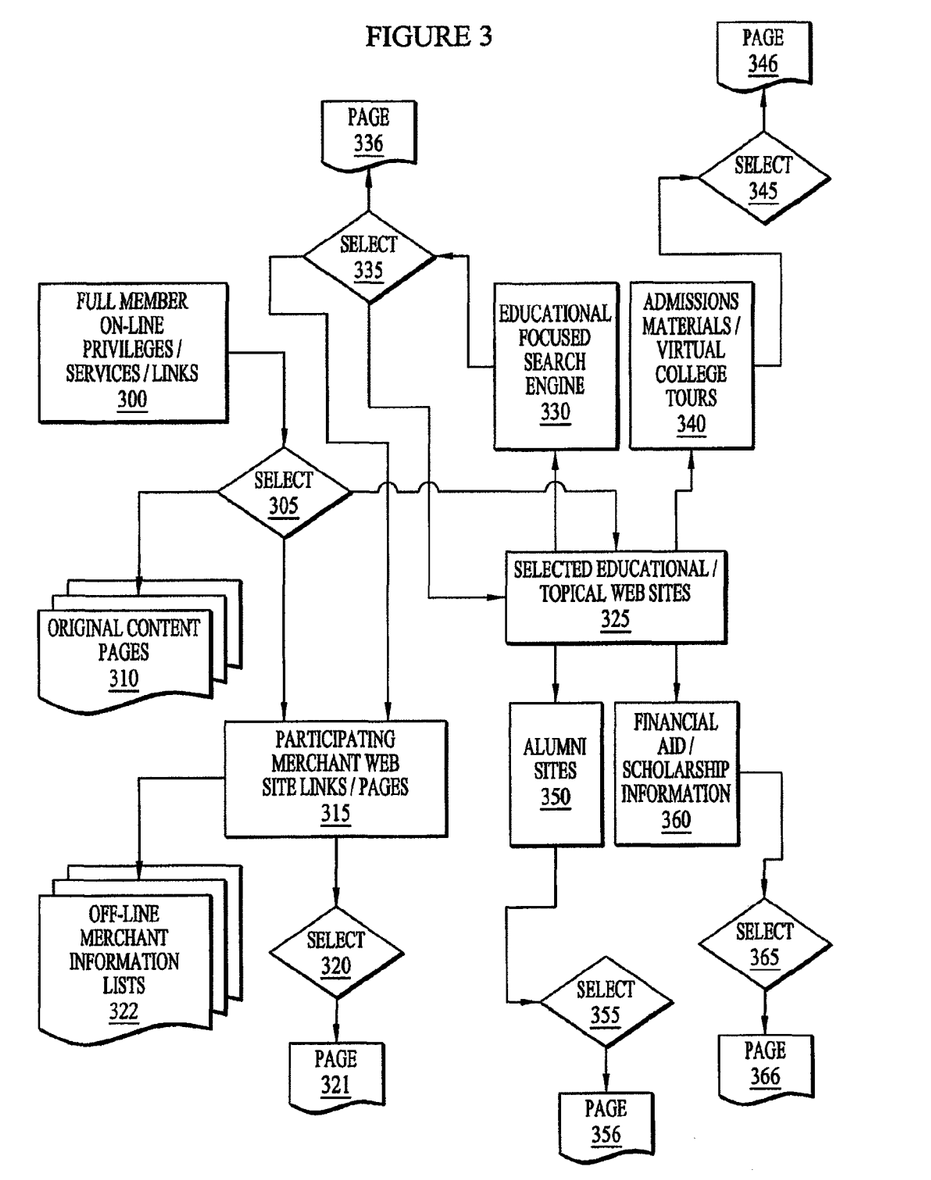
FIG. 3 provides an overview of the privileges, services, and links available to registered members.

FIG. 3 is a flow chart briefly illustrating a number of the various options available to registered members after login to the TuitionFund.com Web Site in preferred embodiments (See FIG. 2, at 210). Once a registered member accesses the TuitionFund.com Web Site (See FIG. 2, at 210) and proceeds through the sequence of events for member login, the member may then browse among the content pages, links, and services that comprise the Full Member On-line Privileges/Services/Links 300 pages and thus, Select 305 content pages, links, or services of interest. In some embodiments, the registered member may Select 305 to proceed to the Web Site's Original Content Pages 310. In some preferred embodiments, the Original Content Pages 310 may comprise articles of interest to those in the field of higher education. Further, the present invention contemplates that the articles of interest in the Original Content Pages 310 may comprise essays, news articles, topical discussions, instructive content, surveys, informative pieces, or monographs, authored by individuals and organizations involved in higher education.

In alternative embodiments, the registered member may Select 305 to proceed to any one or more of a number or list of links to Participating Merchant Web Sites 315 that offer rebates to registered members. Thus, the registered member then Selects 320 a particular participating Merchant Web Site 315 of interest and proceeds to visit that merchant's web Page 321. In particularly preferred embodiments, the links to Participating Merchant Web Site pages 315 are categorized into sites with similar or related content. Alternatively, the registered member may Select 320 to view (i.e., browse) pages of Off-line Merchant Information Lists 322 lists in their area that offer members rebates. The Off-line Merchant Information Lists 322 may, similarly, be categorized into merchants with similar or related content in a given defined local.

In some embodiments, the registered member may Select 305 to proceed to the Selected Educational/Topical Web Sites area 325 of the TuitionFund.com Web Site. The present invention contemplates that the Selected Educational/Topical Web Sites area 325 may comprise links and pages of interest to those interested in all aspects of education, and particularly higher education. Selected Educational/Topical Web Site area 325 topics include, but are not limited to, an Educational Focused Search Engine 330, Admissions Materials/Virtual College Tours 340, Alumni Web Sites 350, and Financial Aid/Scholarship Information 360, etc.

Thus, in some embodiments, the registered member viewing the Selected Educational/Topical Web Sites 325 page may proceed to the Web Site's Educational Focused Search Engine 330. In preferred embodiments, the Educational Focused Search Engine 330 search engine may comprise Galaxy.com, or other like search engines. Registered members proceeding to run a search on the site's Educational Focused Search Engine 330 will Select 335 from the results of their searches to view one or a number of Pages 336 related to topics and issues in higher education. In other embodiments, registered members who run searches from the Educational Focused Search Engine 330 may Select 335 to proceed to Participating Merchant Web Sites 315.

In other embodiments of the present invention, the registered member may proceed from the Selected Educational/Topical Web Sites area 325 to the Admissions Materials/Virtual College Tours pages 340. In preferred embodiments, Admissions Materials/Virtual College Tours pages 340 may comprise pages posted directly to the TuitionFund.com Web Site by various institutions of higher education, or alternatively, may comprise links to such pages. In some embodiments, the Admissions Materials/Virtual College Tours pages 340 may comprise multimedia presentations or links to multimedia presentations from various institutions of higher education. In other embodiments, various institutions of higher education may post electronic admissions forms on the Admissions Materials/Virtual College Tours pages 340 or links to such forms. The present invention also contemplates that the Admissions Materials/Virtual College Tours pages 340 may comprise informative, topical, or entertaining pages posted by various institutions of higher education or links to such pages. Registered members entering the Admissions Materials/Virtual College Tours pages 340 will thus Select 345 from these and other highlighted options to before proceeding one or more Pages 346 of interest.

In still other embodiments, the registered user may proceed from the Selected Educational/Topical Web Sites area 325 to various Alumni Web Sites 350 links and pages. The registered member may Select 355 to proceed to any one or more of a number of links and Pages 356 in this area. Examples of Pages 356 in this area include, but are not limited to, links and pages offering special alumni organization offers and incentives, information and links to the athletics programs at the various institutions, information or links on alumni networking and career development resources, and message, bulletin-boards, or chat groups for alumni, etc.

In yet other embodiments, a link to Financial Aid/Scholarship Information 360 links and pages may be provided from the Selected Educational/Topical Web Sites area 325. In preferred embodiments, the Financial Aid/Scholarship Information 360 links and pages may comprise topical articles, financial tools and calculators, as well as information provided by state and federal government agencies, and private and institutional higher education lenders. In other preferred embodiments, the various institutions of higher education may provide links and pages concerning their particular financial aid policies and scholarship opportunities. Additionally, in other embodiments, private charitable institutions may provide information or their various aid and scholarship opportunities.

The above-mentioned embodiments of the Full Member On-line Privileges/Services/Links 300 are merely representative of several specific embodiments that comprise the present invention; other embodiments relative to higher education will be evident to those skilled in the art.

Preferred Merchant/Member Rebate Sales Schemes

II. On-Line Merchants Registered with a Rebate Network Manager

Figure 4:
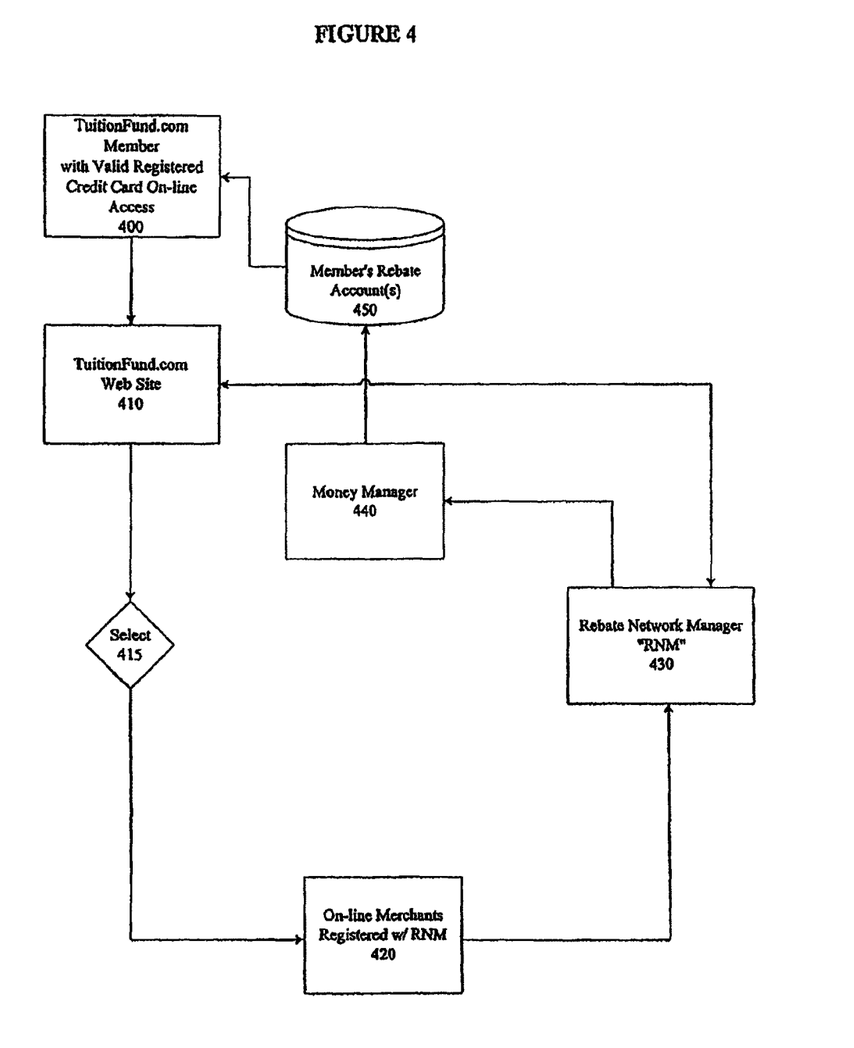
FIG. 4 provides an overview of one merchant rebate sales embodiment.

FIG. 4 is a flow chart that briefly illustrates one contemplated on-line merchant rebate sales scheme. In preferred embodiments, a Registered Member 400 with an established on-line connection (See FIG. 2, at 201-203, and 205) proceeds to enter the Tuitionfund.com Web Site 410. Once the member obtains access to the TuitionFund.com Web Site 410, the member may then generally proceed to the participating on-line merchants links and pages area (See FIG. 3, at 315). Next, the present invention contemplates that the registered member will Select 415 one or more participating merchants from which to purchase goods and/or services. In particularly preferred embodiments, the selected On-line Merchant 420 will be registered with a Rebate Network Manager 430. The present invention contemplates that the Rebate Network Manager 430 monitors the sales of its Registered On-line Merchants 420. When a registered merchant consummates a sale of goods or services with a Registered Member 400, the Rebate Network Manager 430 debits the account of the Registered On-line Merchant 420, based on an existing formula, and calculates the rebate due the Registered Member 400. The present invention also contemplates that the Rebate Network Manager 430 receives a small percentage of each consummated sale involving one of its Registered On-line Merchants 420, and also calculates a percent fee, from 0.001-30.00%, based on the sum of the particular transaction, as a payment to the TuitionFund.com Web Site 410. The Rebate Network Manager 430 disburses the rebate sum earned by a particular Registered Member 400 from each transaction with a Registered On-Line Merchant 420, to the professional Money Manager 440 for further disbursement into the Registered Member's 400 various investment Fund and Accounts options 450 (See also FIG. 1, at 115). In preferred embodiments, the Rebate Network Manager 430 affiliate may comprise a service such as InfoSpace.com. In addition, as stated above, in particular embodiments, the professional Money Managers 440 contemplated may comprise Charles Schwab, Fidelity, American Express, or Merrill Lynch.

III. Merchants not Registered with a Rebate Network Manager

Figure 5:
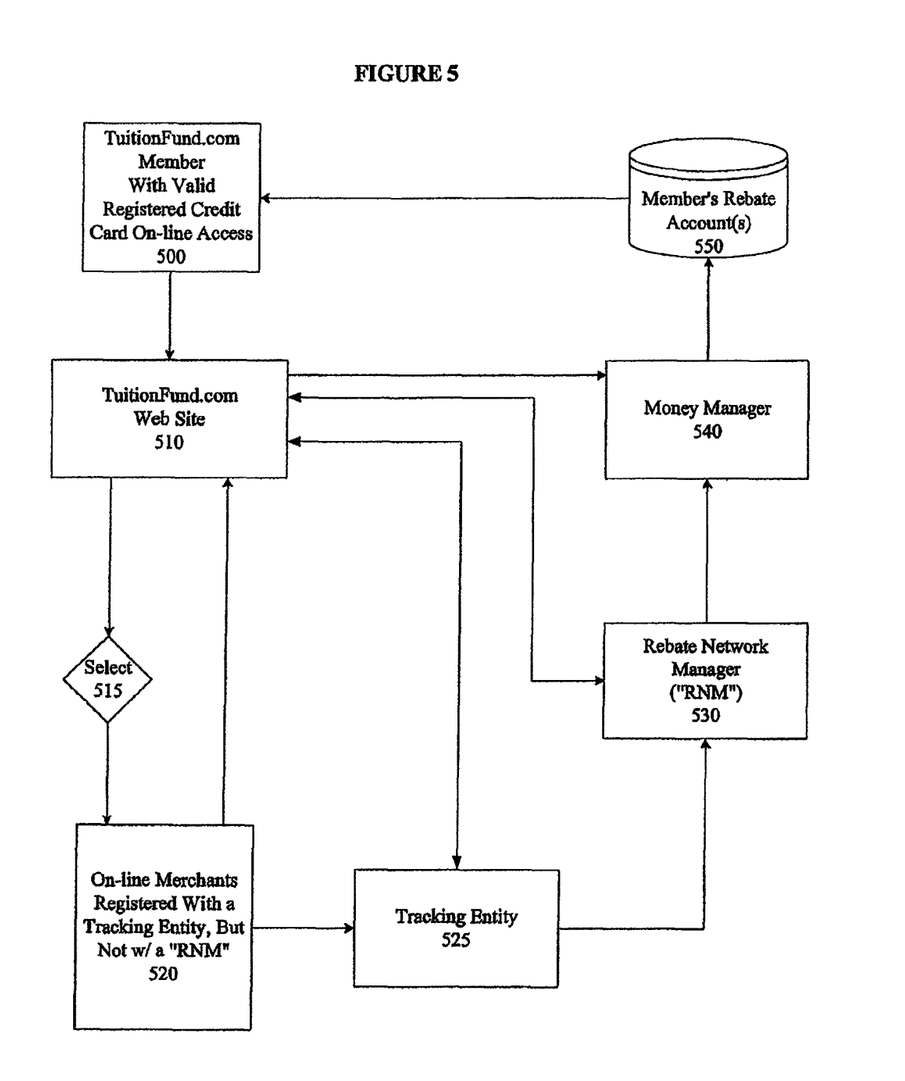
FIG. 5 provides an overview of one merchant rebate sales embodiment.

FIG. 5 is a flow chart briefly illustrating another contemplated merchant rebate scheme. In a preferred embodiment, a Registered Member 500 with an established on-line connection (See FIG. 2, at 201-203, and 205) proceeds to enter the TuitionFund.com Web Site 510. Once the member obtains access to the TuitionFund.com Web Site 510, the member may then generally proceed to the participating on-line merchants links and pages area (See FIG. 3, at 315). Next, the present invention contemplates that the Registered Member 500 will proceed to Select 515 one or more participating On-line Merchants 520 (i.e., merchants affiliated/registered with the tracking entity, but not registered with network rebate manager) for purchasing goods/services. It is contemplated that the Registered Member 500 and the On-line Merchants 520 will proceed to consummate a transaction for the sale of goods/services.

In preferred embodiments, a Tracking Entity 525 monitors and compiles information about the transactions between Registered Members 500 and On-line Merchants 520. In preferred embodiments, the Tracking Entity 525 will periodically and regularly communicate this information to either TuitionFund.com or the TuitionFund.com Web Site 510. The present invention contemplates that such information may include the date, transaction amount, the rebate due, or rebate percentage offered, and member account information, etc. The present invention also contemplates that the On-line Merchants 520 will remit directly to an account maintained by TuitionFund.com or another entity any rebate monies earned by Registered Members 500 from the sale of goods/services. The amount of the rebate monies awarded by the On-line Merchants 520 to Registered Members 500 may vary based on established formulas, sale incentives, or other calculations particular to the On-line merchants 520.

In other preferred embodiments, the On-line Merchant 520 directly remits to TuitionFund.com a percentage, or fixed amount, of each Registered Member's 500 transactions it consummates as revenue to the TuitionFund.com. In some embodiments, the percentage remitted by the On-line Merchant is based on total sales to Registered Members 500. Alternatively, the sum remitted may be based on a fixed percentage amount (e.g., 0.001-30.00) of each sale to an individual Registered Member 500. In particularly preferred embodiments, the On-line Merchant 520 establishes and funds a debitable account held at TuitionFund.com, or another entity, for the purpose of disbursing from such account those monies earned by Registered Members 500 on purchases consummated with the particular On-line Merchant 520. Alternatively, the On-line Merchant may deposit funds into an aggregate account held at TuitionFund.com, or another entity, such aggregate account comprising rebate funds from numerous On-line Merchants 520. It is contemplated that each On-line Merchant will deposit in either the aggregate account or an account particular to that On-line Merchant 520 preferably a sum of from about 10,000-50,000 dollars, more preferably from 50,000 to 100,000 dollars, and most preferably from 100,000 to 1,000,000 or more dollars. The present invention contemplates that the On-line Merchant debitable account may be funded by the On-line Merchant regularly and periodically, or at such times as agreed upon by TuitionFund.com and the particular On-line Merchant 520. the present invention further contemplates that TuitionFund.com may use any portion of the On-line Merchant 520 debitable account funds for any lawful purpose, and may collect and use any interest or premiums that may accrue on the debitable accounts.

In preferred embodiments, the Tracking Entity 525 provides relevant reports concerning Registered Member 500 transactions with On-line Merchants 520 to a Rebate Network Manager 530. The content of such reports may include, but is not limited to, information concerning the date and time of particular transaction, Registered Member 500 identification, the particular On-line Merchant, the rebate monies due to the Registered member 500, the amount owed TuitionFund.com, and any other relevant information about the transaction.

In certain preferred embodiments, the Tracking Entity 525 will periodically and regularly communicate information concerning member transactions to TuitionFund.com 510. The present invention further contemplates that the such information may include the date, transaction amount, the rebate due, or rebate percentage offered, and member account information, etc. Additionally, the Tracking Entity 525 may communicate information to TuitionFund.com 510 concerning Registered Member 500 spending habits, for example, compiled information on the frequency of purchases, general of merchants visited, or other topical information obtained by the Tracking Entity 525 from the various On-line Merchants 520. Alternatively, TuitionFund.com 510 may collect and order the various Registered Member 500 purchasing data and information communicated to it from the Tracking Entity 525. The present invention further contemplates that member purchasing information may be gathered from an number of sources, including but not limited to, the various merchant rebate schemes disclosed, from an affiliated tracking entity/rebate network manager, or from third party consumer monitoring and market research organizations. In other preferred embodiments, and subject to TuitionFund's member terms and conditions and privacy policy, member purchasing information may solicit advertising interest from site and organizations not already registered or affiliated with TuitionFund.com. Additionally, subject to TuitionFund's member terms and conditions and privacy policy, TuitionFund.com may communicate information concerning the transactions between one or more Registered Members 500 and one or more On-line Merchants 520. For example, TuitionFund.com may communicate any pertinent information concerning the gross sales, unit volumes, and/or marketing and consumer research, of one or more On-line Merchants 520, or more particular information concerning one or more Registered Member's 500 spending purchases and the like.

The present invention contemplates that the Rebate Network Manager 530 may use the information communicated to it by TuitionFund.com for any agreed upon business purposes. The Rebate Network Manager 530 may likewise further tabulate and calculate any sums due or owing to either TuitionFund.com 510 or the Registered Member 500 from this information. In particularly preferred embodiments, the Rebate Network Manager 530 may debit the debitable accounts established by the On-line Merchants 520 and transfer a particular earned rebate to the Money Manager 540; alternatively, TuitionFund.com 510 may debit these debitable accounts and transfer the earned rebate to the Money Manager 540. Additionally, the present invention contemplates that any Registered Member 500 rebate monies earned that are transferred may be transferred in the aggregate for a particular grouping of Registered Members 500, or particular grouping of Registered Member 500 transactions.

Thus, the present invention contemplates that any necessary information for awarding or allocating an earned sum to a particular member may be performed by the Rebate Network Manager 530 based on the information communicated to it by On-line Merchant(s) 520, the Tracking Entity 525, or TuitionFund.com 510. Alternatively, in yet other embodiments, the information may be attached to the ultimate transfer of member earned rebate monies to the Money Manager 540 for disbursement and award to a particular Registered Member's Rebate Accounts 550 (See also, FIG. 1, at 115). In still further embodiments, TuitionFund.com 510 may transfer the rebate monies earned by Register Members 500 directly to the Money Manager 540. In these particular embodiments, the present invention contemplates that the transfer of monies from TuitionFund.com 510 to the Money Manager 540 may also entail and pertinent data for disbursing the monies. The present invention is not intended to be limited to any particular methodology for awarding and accrediting a particular member with his/her earned rebate monies.

The present invention is also not intended to be limited by the terms of calculating either the rebate monies earned by Registered Members 500, or the revenue monies due to TuitionFund.com from transactions between Registered Members 500 and particular On-line Merchants 520. Indeed, any commercially practicable agreement may be accepted within the scope of the present invention. Moreover, the present invention is not intended to be limited to any of the described calculations for determining whether a sum is payable or owing to any party. Furthermore, where any such sums are payable or owing, it is not intended that the present invention be limited by the method of transferring such sums or amounts (e.g., checks, drafts, negotiable instruments, offsets, credits, or any other means of transferring wealth). The present invention is also not intended to be limited by the means employed to accomplish any particular transfer of a sum due or owing (e.g., electronic transfers, wire transfers, checks, debits, and the like, are all within the scope of the present invention).

In some preferred embodiments, the Rebate Network Manager 530 may comprise service providers such as, but not limited to, InfoSpace.com. In other preferred embodiments, the Tracking Entity 525 may comprise service providers, such as but not limited to, LinkShare.com, or Befree.com.

IV. Off-Line Merchants

Figure 6:
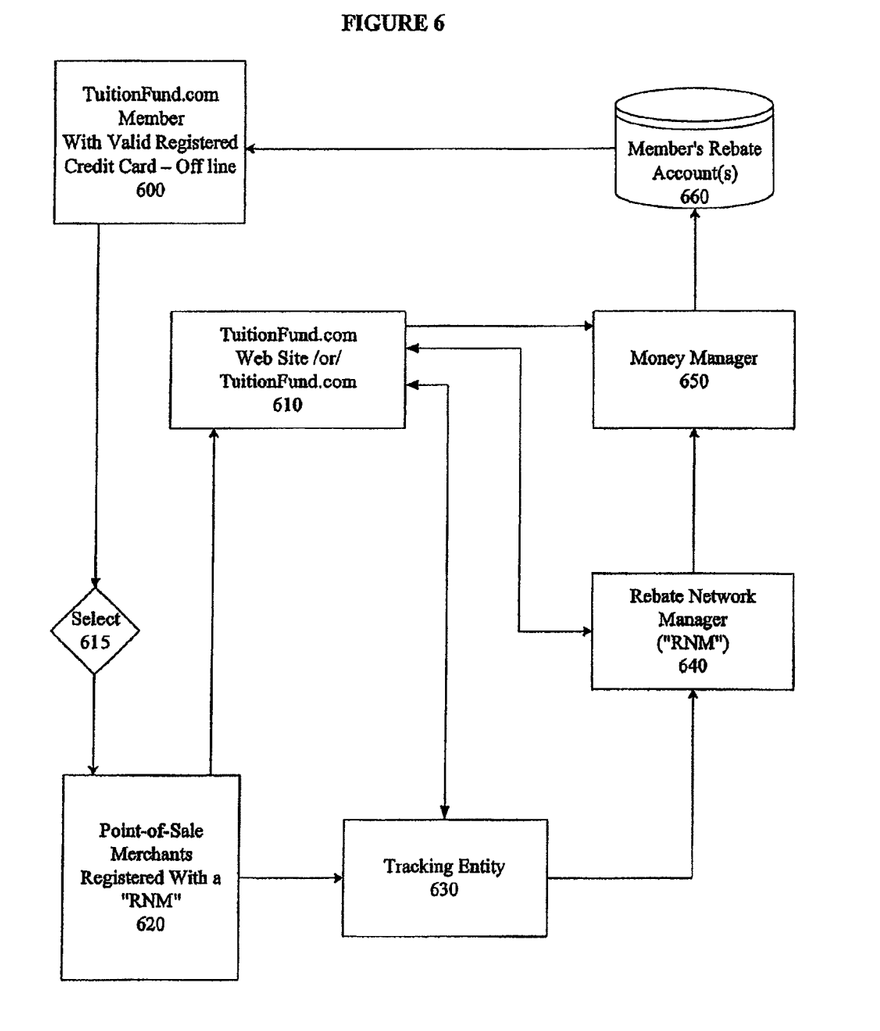
FIG. 6 provides an overview of one merchant rebate sales embodiment.

FIG. 6 is a flow chart briefly illustrating yet another contemplated merchant rebate sales scheme. Registered Member (off-line) 600 may Select 615 to visit a Point-of-Sale Merchant 620 (i.e., at the merchant's place of business). In preferred embodiments, the Registered Member (off-line) 600 and the Point-of-Sale Merchant 620 will consummate a sale of goods or services. In preferred embodiments, the Point-of-Sale Merchant 620 is indirectly connected via a communications link to a Rebate Network Manager 640. The present invention contemplates that the Point-Sale-Merchant 620 will be registered with the Rebate Network Manager 640. In particularly preferred embodiments, the Rebate Network Manager 640 calculates the rebate due the Registered Member 600 based on an existing formula, and then debits the account of the Point-of-Sale Merchant 620 for the rebate awarded the Registered Member (off-line) 600. The present invention further contemplates that the Rebate Network Manager 640 receives a small percentage of each consummated sale involving a Point-of-sale Merchant 620, and also calculates a percent fee, from 0.001-30.00%, based on the sum of the particular transaction, as a payment to the TuitionFund.com Web Site 610. The Rebate Network Manager 640 disburses the rebate sum earned by a particular Registered Member 600 from each transaction with a Point-of-Sale Merchant 620, to the professional Money Manager 650 for further disbursement into the Registered Member's 600 various investment Funds and Accounts 660 (See also FIG. 1, at 115). In preferred embodiments, the Rebate Network Manager 640 affiliate may comprise a service such as InfoSpace.com, or like service providers. Also, as stated above, in particular embodiments, the professional Money Managers 650 contemplated may comprise Charles Schwab, Fidelity, American Express, or Merrill Lynch, or similar financial services firms.

All publications and patents mentioned in the above specification are herein incorporated by reference. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in relevant fields are intended to be within the scope of the following claims.

I claim:

1. A method of providing a merchant funded incentive rebate or awards program, the method comprising:

enrolling at least one participating member account with enrolled member information being stored in memory, the enrolled account capable of being used to make both internet based purchases with participating online merchants and point-of-sale purchases at a participating merchant's place of business;

having at least one participating merchant in the program funding merchant incentive rebates or awards for qualifying purchases by a participating member using a member's enrolled account;

receiving account purchase transaction information from at least one processor belonging to a tracking entity, the at least one processor being located at a location or locations other than the location of a participating merchant, and said at least one processor tracking account purchases to provide account purchase transaction information, said account purchase transaction information including account purchase transaction information of at least one participating merchant in the program;

monitoring all of said account purchase transaction information being provided by the at least one processor belonging to a tracking entity, said account purchase transaction information including account purchase transaction information of at least one participating merchant in the program, and correlating said account purchase transaction information with stored enrolled member identifying information using at least one processor that is located at a location or locations other than the location of a participating merchant;

determining, via at least one processor that is located at a location or locations other than the location of a participating merchant, whether or not a purchase transaction is with a particular participating merchant using an enrolled member account, and whether said purchase transaction is a qualifying purchase entitling the participating member to a participating merchant funded incentive rebate or award; and calculating, using at least one processor located at a location or locations other than the location of a participating merchant, an incentive rebate or award due an enrolled member for a qualifying purchase with a participating merchant, based upon an established formula or participating merchant sales incentive.

2. The method of claim 1, wherein the incentive rebate or award amount due an enrolled member may be applied as a credit to at least one account, an offset to at least one account, or as a credit or an offset to at least one instrument accepted as a means of payment.

3. The method of claim 2, wherein the account is selected from a group, including mutual funds, savings accounts, bond funds, stock index funds, money market accounts, annuities, any other investment grade securities or equities allowed by law, a charitable donation account, or a loan payment account.

4. The method of claim 2, further comprising:
generating information for applying at least a portion of the incentive rebate or award amount in a participating member's associated account towards indebtedness owed to banks or other financial institutions, commercial loan companies, state or federal government lending agencies, or private organizations.

5. The method of claim 1, wherein a participating merchant funds varying rebate or award rates to incentivize certain sales.

6. The method of claim 1, wherein the participating member's enrolled account is either a credit card related account, a debit card related account, or a checking account related account.

7. The method of claim 1, wherein a participating member's enrolled account and the account in which a participating member's incentive rebate or award amount is applied as a credit or offset to is the same account.

8. The method of claim 1, wherein a sponsoring organization may receive a portion of the qualifying sales, or the incentive rebates or awards, as compensation.

9. A method of generating incentive rebate or awards information for a merchant funded incentive rebate or awards program, the program including participating members, at least one enrolled account for a participating member with enrolled member information being stored in memory, the enrolled account capable of being used to make both internet based purchases with participating online merchants and point-of-sale purchases at a participating merchant's place of business, and at least one participating merchant in the program funding incentive rebates or awards for qualifying purchases by a participating member using a member's enrolled account, the method comprising:

receiving account purchase transaction information from at least one processor belonging to a tracking entity, the at least one processor being located at a location or locations other than the location of a participating merchant, and said at least one processor tracking account purchases to provide account purchase transaction information, said account purchase transaction information including account purchase transaction information of at least one participating merchant in the program;

monitoring all of said account purchase transaction information being provided by the at least one processor belonging to a tracking entity, said account purchase transaction information including account purchase transaction information of at least one participating merchant in the program, and correlating said account purchase transaction information with stored enrolled member identifying information using at least one processor that is located at a location or locations other than the location of a participating merchant;

determining, via at least one processor that is located at a location or locations other than the location of a participating merchant, whether or not a purchase transaction is with a particular participating merchant using an enrolled member account, and whether said purchase transaction is a qualifying purchase entitling the participating member to a participating merchant funded incentive rebate or award; and calculating, using at least one processor located at a location or locations other than the location of a participating merchant, an incentive rebate or award due an enrolled member for a qualifying purchase with a participating merchant, based upon an established formula or participating merchant sales incentive.

10. The method of claim 1 or 9, wherein said at least one processor that belongs to a tracking entity and tracks account purchases to provide account purchase transaction information is located at a banking facility or other facility which processes the applicable qualifying card account(s) or other qualifying account(s) transactions.

11. The method of claim 1 or 9, further comprising:
utilizing a participating member's account purchase transaction information, a participating member's spending habits or participating member's profile obtained in connection with the program to assist a current or prospective participating merchant in designing an incentive rebate or award offer to at least one participating member.

12. The method of claim 1 or 9, further comprising:
advertising or promoting a specific incentive rebate or award offer from a funding merchant to at least one participating member.

13. The method of claim 12, wherein the advertising or promotion of a specific incentive rebate or award offer is disseminated to at least one participating member using push technology.

14. The method of claim 12, wherein the advertising or promotion of a specific incentive or award offer is requested by at least one participating member using pull technology.

15. The method of claim 1 or 9, further comprising:
marketing information relating to enrolled members, participating merchants, or their purchase or sale activity to at least one organization, not already registered or affiliated with the program.

16. The method of claim 1 or 9, wherein said at least one processor belonging to a tracking entity that provides account transaction information is located at a different location than the at least one processor that monitors said account purchase transaction information and correlates said account purchase transaction information with stored enrolled member identifying information.

17. The method of claim 1 or 9, wherein a managing organization of the incentive rebate or awards program may receive a portion of the qualifying sales, or the incentive rebates or awards, as compensation.

18. The method of claim 1 or 9, wherein the incentive rebate or award rates or amounts are merchant-specific.

19. The method of claim 1 or 9, wherein the established formula includes different incentive rebate or award rates for internet based on-line purchases versus point of sale purchases.

20. The method of claim 1 or 9, wherein said at least one processor belonging to a tracking entity that provides account purchase transaction information is located at a different location than the at least one processor determining whether said purchase transaction is a qualifying purchase entitling the participating member to a participating merchant funded incentive rebate or award.

21. The method of claim 1 or 9, wherein a tracking entity may provide additional transaction information to either a managing organization or a sponsoring organization of the incentive rebate or awards program.

22. The method of claim 9, wherein a participating member's incentive rebate or award is applied as a credit or an offset to at least one account, or as credit or an offset to at least one instrument accepted as a means of payment.

23. A system for providing a merchant funded incentive rebate or awards program, the program including participating members, at least one enrolled account for a participating member with enrolled member information being stored in memory, the enrolled account capable of being used to make both internet based purchases with participating online merchants and point-of-sale purchases at a participating merchant's place of business, and at least one participating merchant in the program funding merchant incentive rebates or awards for qualifying purchases by a participating member using a participating member's enrolled account, the system comprising:

receiving account purchase transaction information from at least one processor belonging to a tracking entity, with the at least one processor being located at a location or locations other than the location of a participating merchant in the program, and said at least one processor tracking account purchases to provide account purchase transaction information, said account purchase transaction information including account purchase transaction information of at least one participating merchant in the program;

monitoring all of said account purchase transaction information being provided by the at least one processor belonging to a tracking entity, said account purchase transaction information including account purchase transaction information of at least one participating merchant in the program, and correlating said account purchase transaction information with stored enrolled member identifying information using at least one processor located at a location or locations other than the location of a participating merchant;

determining, via at least one processor located at a location or locations other than the location of a participating merchant, whether or not a purchase transaction is with a particular participating merchant using an enrolled member account, and whether said purchase transaction is a qualifying purchase entitling the participating member to a merchant funded incentive rebate or award; and calculating, using at least one processor located at a location or locations other than the location of a participating merchant, an incentive rebate or award due an enrolled member for a qualifying purchase with a participating merchant, based upon an established formula or participating merchant sales incentive.

24. The system of claim 23, further comprising at least one processor configured to generate information needed to apply a member's incentive rebate or award as a credit or an offset to at least one account, or as a credit or an offset to at least one instrument accepted as a means of payment.

25. The system of claim 23, wherein a tracking entity may provide additional transaction information to either a managing organization or a sponsoring organization of the incentive rebate or awards program.

26. The system of claim 23, wherein said at least one processor belonging to a tracking entity that provides account purchase transaction information is located at a location different than the at least one processor that monitors said account purchase transaction information and correlates said account purchase transaction information with stored enrolled member identifying information.

27. The system of claim 23, wherein said at least one processor belonging to a tracking entity that provides account purchase transaction information is located at a different location than the at least one processor that determines whether said purchase transaction is a qualifying purchase entitling the participating member to a participating merchant funded incentive rebate or award.

28. The system of claim 23, wherein the established formula includes different incentive rebate or award rates for internet based on-line purchases versus point of sale purchases.

\* \* \* \* \*